US009330306B2

(12) United States Patent
Stanek et al.

(10) Patent No.: US 9,330,306 B2
(45) Date of Patent: May 3, 2016

(54) 3D GESTURE STABILIZATION FOR ROBUST INPUT CONTROL IN MOBILE ENVIRONMENTS

(71) Applicant: Panasonic Intellectual Property Management Co., Ltd., Osaka (JP)

(72) Inventors: Ganymed Stanek, Palo Alto, CA (US); Philippe Morin, Goleta, CA (US); Luca Rigazio, San Jose, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 42 days.

(21) Appl. No.: 14/301,410

(22) Filed: Jun. 11, 2014

(65) Prior Publication Data

US 2015/0363639 A1 Dec. 17, 2015

(51) Int. Cl.
*G06K 9/00* (2006.01)
*G06F 3/01* (2006.01)

(52) U.S. Cl.
CPC ............ *G06K 9/00375* (2013.01); *G06F 3/017* (2013.01); *G06K 9/00201* (2013.01); *G06K 9/00335* (2013.01); *G06F 2200/1636* (2013.01)

(58) Field of Classification Search
USPC .......................................................... 382/103
See application file for complete search history.

(56) References Cited

U.S. PATENT DOCUMENTS

| 7,499,569 B2 * | 3/2009 | Sato ................... G06K 9/00832 345/156 |
| 2002/0126876 A1 * | 9/2002 | Paul ........................ G06F 3/017 382/104 |
| 2006/0192782 A1 * | 8/2006 | Hildreth .................. A63F 13/00 345/473 |
| 2008/0263012 A1 * | 10/2008 | Jones ................. G06F 17/30811 |
| 2009/0092284 A1 * | 4/2009 | Breed ...................... B60J 10/00 382/103 |
| 2009/0195538 A1 * | 8/2009 | Ryu ........................ G06F 3/016 345/419 |
| 2010/0027846 A1 * | 2/2010 | Xu ........................ G06K 9/6296 382/107 |
| 2010/0091126 A1 | 4/2010 | Siddiqui et al. |

(Continued)

FOREIGN PATENT DOCUMENTS

CN 102607509 A 7/2012
GB 2481027 A 12/2011

OTHER PUBLICATIONS

Fingas, Jon, "Google applies for patent on gesture-based car controls," Engadget, Oct. 3, 2013, http://www.engadget.com/2013/10/03/google-applies-for-patent-on-gesture-based-car-controls/, accessed May 9, 2014.

(Continued)

*Primary Examiner* — Alex Liew
(74) *Attorney, Agent, or Firm* — Harness, Dickey & Pierce, P.L.C.

(57) ABSTRACT

A non-contact gesture sensor is mounted within a vehicle for vehicle occupants to enter control commands by using hand gestures. The effects of vehicle motion and vibration are stabilized by an electronic circuit that includes an inertial motion sensor (IMU) in rigidly fixed relation to the gesture sensor. An adaptive filter processes the gesture sensor signal and the IMU sensor signal by modeling the arm and hand as a semi-rigid articulated body using a transfer function that relates accelerations measured by the IMU with vehicle motion-induced accelerations of the hand. The filter calculates a noise-reduced gesture signal by subtracting out the motion-induced accelerations and measurement noise. The filter also outputs a confidence measure that controls a threshold circuit that inhibits use of the filtered gesture signal when confidence in the filter's system estimation is low.

25 Claims, 7 Drawing Sheets

(56) References Cited

U.S. PATENT DOCUMENTS

| | | | |
|---|---|---|---|
| 2010/0166259 A1* | 7/2010 | Otsu | G06K 9/4609 |
| | | | 382/103 |
| 2011/0019094 A1* | 1/2011 | Rossignol | G06K 9/40 |
| | | | 348/607 |
| 2012/0068956 A1 | 3/2012 | Jira et al. | |
| 2012/0105613 A1 | 5/2012 | Weng et al. | |
| 2012/0207345 A1 | 8/2012 | Tang | |
| 2012/0327125 A1 | 12/2012 | Kutliroff et al. | |
| 2013/0261871 A1 | 10/2013 | Hobbs et al. | |

OTHER PUBLICATIONS

Zobl, Martin, et al. "A Usability Study on Hand Gesture Controlled Operation of In-Car Devices," proceedings of 9th International Conference on Human-Computer Interaction, New Orleans, Louisiana, Aug. 5-10, 2001.

Kim, Ji-Hwan, et al., "Forearm Motion Tracking with Estimating Joint Angles from Inertial Sensor Signals," proceedings of 2nd International Conference on Biomedical Engineering and Informatics, Tianjin, China, Oct. 17-19, 2009.

* cited by examiner

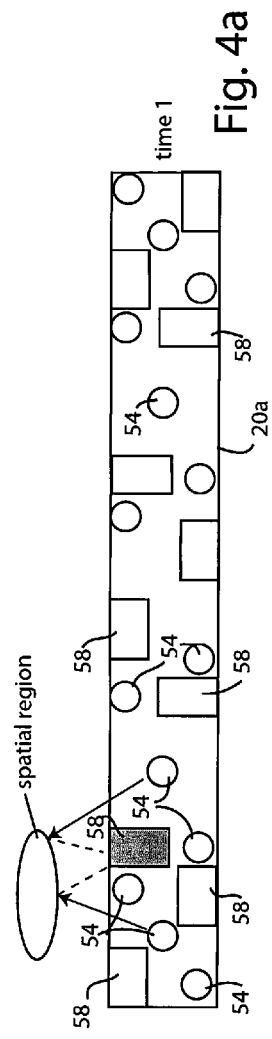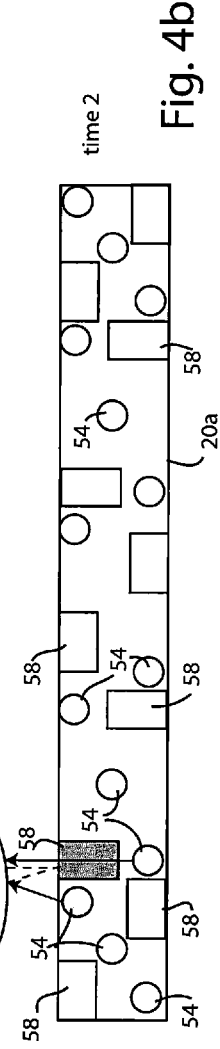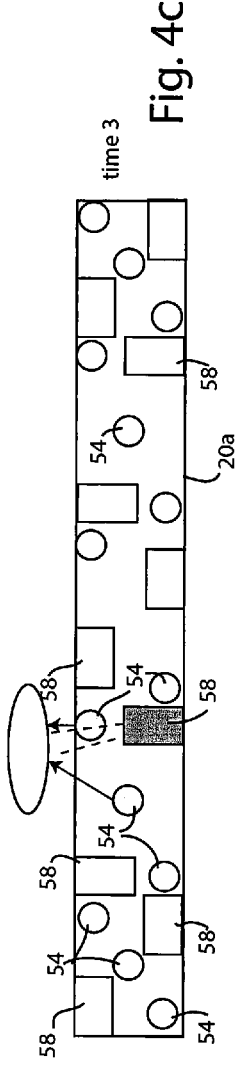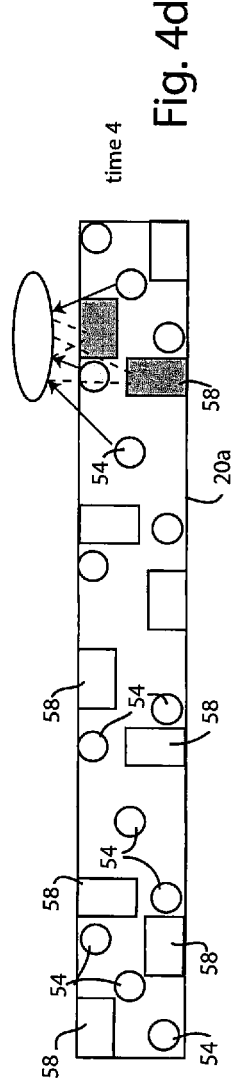

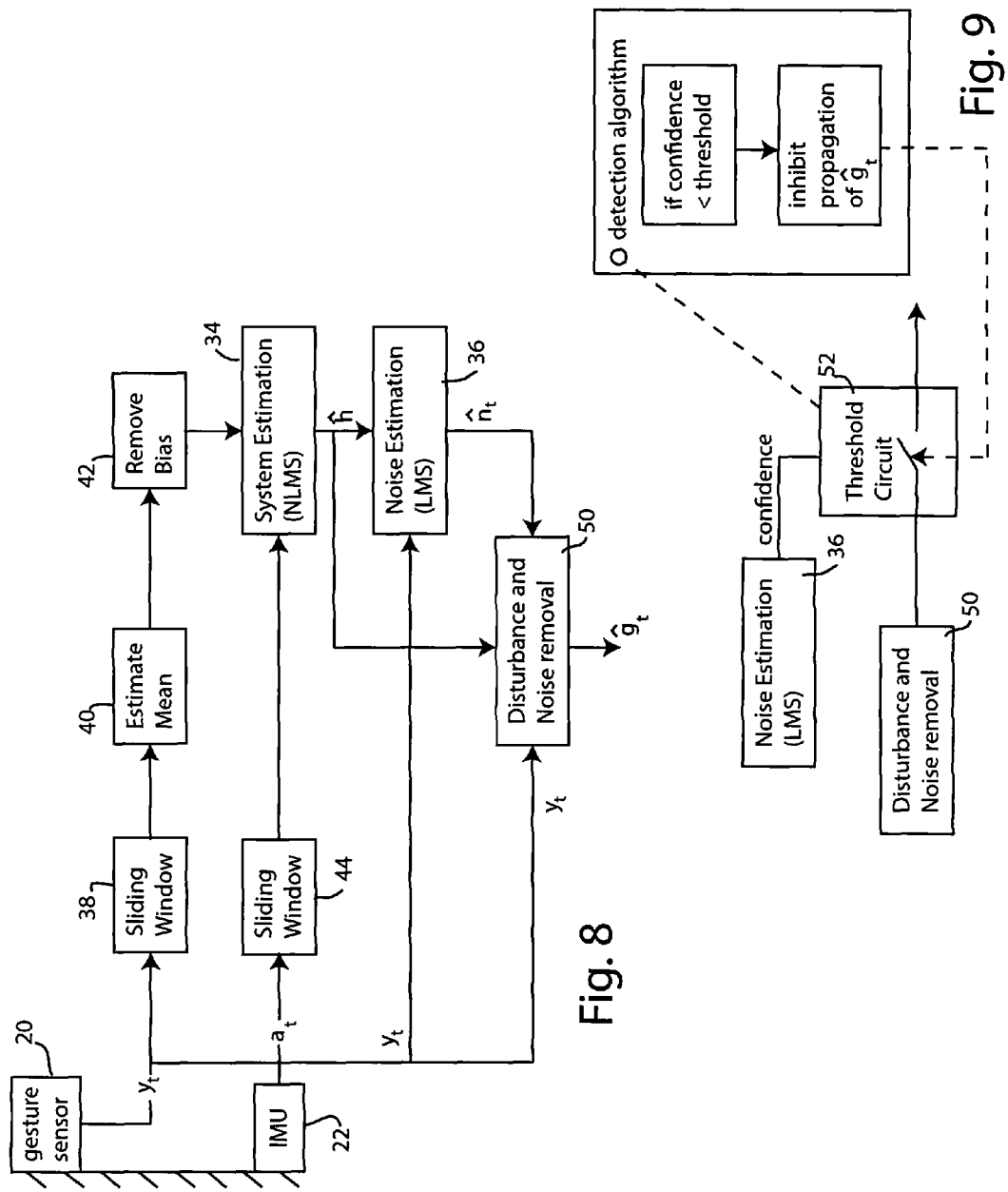

3D GESTURE STABILIZATION FOR ROBUST
INPUT CONTROL IN MOBILE
ENVIRONMENTS

FIELD

The present disclosure relates generally to in-air or non-contact gesture sensors. More particularly, the disclosure relates to gesture sensor stabilization techniques to facilitate robust input control in mobile environments.

BACKGROUND

This section provides background information related to the present disclosure which is not necessarily prior art.

As interactive vehicular electronic systems become more complex, vehicle cockpit designers and engineers continue to look for new and better ways to allow a vehicle occupant to control these systems. Of course, the classic approach is to provide an array of buttons and knobs on the dashboard of the vehicle. There is a practical limit, however, to the number of buttons and knobs that a vehicle occupant will find manageable. Reducing the number of buttons and knobs and replacing those with layers of menu screens has been tried, as has voice control. Menu screens require the vehicle occupant to look at the screen and comprehend what is being displayed there. Even if this takes only a split second, this is time the vehicle occupant is not focused on traffic or other environmental conditions. Voice control offers a different problem. Noise levels within the vehicle cockpit can significantly degrade the reliability of speech recognizers, meaning that some voiced commands may simply not work as intended.

As an alternative to these conventional vehicular control mechanisms, there is some interest today in gestural control. The vehicle occupant makes a hand gesture in the air, which is captured by non-contact sensors and converted into a command for controlling a vehicular electronic system. Such gestural controls have not heretofore been successful, in part because of the wide variance in gestural motions. As more fully explained below, some of this wide variance is due to the fact that the vehicle is moving, often in unpredictable ways. Automotive vehicles are subject to bumps in the road. Airplanes are subject to turbulence in the air. Boats are subject to waves. All of these factors represent sources of noise that make the gesture signal hard to interpret. The problem is even further compounded by the fact that the person making the gestural command may consciously or unconsciously try to compensate for the bumps, turbulence or waves. Human reaction times can vary over a fairly wide range. Thus, when trying to compensate for bumps, there may be little consistency from person to person.

SUMMARY

This section provides a general summary of the disclosure, and is not a comprehensive disclosure of its full scope or all of its features.

The disclosed technology addresses the motion issues that have prevented gestural controls from being successful within moving vehicles. Inertial measurement unit sensors mounted on the vehicle capture kinematic information about the shock forces being delivered to the vehicle and its occupants. An electronic analysis circuit or filter then takes this kinematic information and uses it to process the signals (3D gesture signal) received from the gesture sensor(s). The 3D gesture signal is composed of "an intentional gesture component" (the one intended by the user) and "an unintentional gesture component" (where the unintentional gesture component is provoked by vehicular motion and needs to be removed).

The electronic analysis circuit provides gesture stabilization by mitigating the motion-induced noise, so that the gesture sensor data more closely convey the intended gesture trajectory. In one embodiment, the electronic analysis circuit models the motion-induced noise as having a stationary part and a non-stationary part, where the stationary part models the physical components of the vehicle and the human body.

According to one aspect, the stabilized gesture detecting circuit for use with a vehicle includes an inertial sensor mounted to said vehicle and produces a vehicle motion signal indicative of changes in vehicle motion. The detecting circuit further includes a non-contact gesture sensor mounted in fixed relation to said inertial sensor and produces a gesture signal in response to hand gestural motions of a vehicle occupant. Further, the detecting circuit includes a filter coupled to receive said vehicle motion signal and said gesture signal and produces a filtered gesture signal.

The filter is tuned to reduce motion-induced noise in said gesture signal corresponding to movement of the gesture sensor; and is further tuned to reduce motion-induced noise in said gesture signal corresponding to vehicle motion-induced non-gestural motion of the vehicle occupant's hand.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4a-4d illustrate the manner of operation of the gesture sensor of FIG. 3;

FIG. 8 is a block diagram of a first embodiment of a gesture stabilization filter;

FIG. 9 is a block diagram illustrating the threshold circuit with detection algorithm to perform confidence bands processing;

Corresponding reference numerals indicate corresponding parts throughout the several views of the drawings.

DETAILED DESCRIPTION

Example embodiments will now be described more fully with reference to the accompanying drawings.

Figure 1:
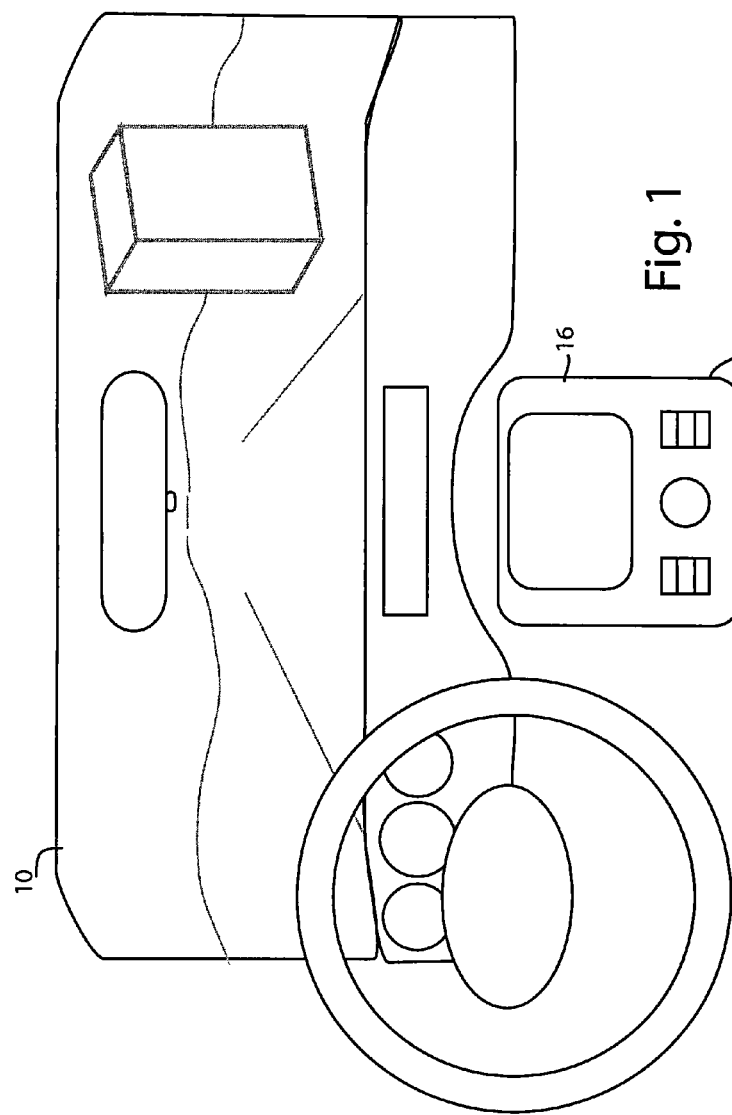
FIG. 1 illustrates an exemplary vehicle cockpit, comprising one mobile environment with which the gesture stabilization system can be used.

Referring to FIG. 1, the cockpit of an exemplary vehicle has been illustrated. In this regard, while an automotive vehicle has been shown here, it will be appreciated that the disclosed stabilization techniques may be used in a variety of different vehicles that travel by land, sea or air. Centrally located beneath the windshield 10 and dashboard 12 is an infotainment center 16 which includes a display screen 18. The infotainment center may also include a GPS system whereby map data are displayed on the screen 18. A gesture sensor 20 is disposed within the cockpit, such as below and slightly forward of the infotainment center so that it is readily accessible by the vehicle driver or front seat vehicle passenger to input gestural commands into the system. Rigidly affixed to the vehicle is an inertial measurement unit or IMU 22. Preferably, the IMU 22 is rigidly affixed to the same structure to which the gesture system 20 is affixed, so that the IMU 22 senses all motions experienced by the gesture sensor 20. If desired, the IMU 22 can be integrally fabricated as part of the gesture sensor 20.

In one preferred embodiment, the IMU 22 comprises three accelerometers positioned at three mutually orthogonal angles to sense acceleration in all three dimensions (x, y, z) of three-dimensional space. In a second preferred embodiment, the IMU 22 further includes three gyroscopic sensors in addition to the three accelerometers. The gyroscopic sensors are positioned along the three orthogonal axes to sense the yaw, pitch and roll angular movements.

The gesture sensor 20 is designed to detect gestural movements of a user's hand or fingers when they are placed in the near field (close proximity) to the sensor. The gesture sensor 20 is preferably a non-contact sensor. In other words, the user provides gestural commands within the spatial region in front of and/or above the gesture sensor and the sensor converts those gestural commands into electrical signals that are further processed, as will be more fully described.

Figure 2:
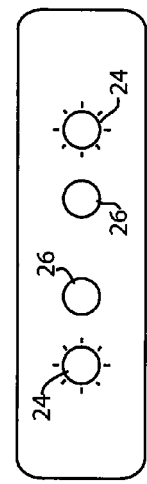
FIG. 2 depicts a first embodiment of a gesture sensor with which the gesture stabilization system can be used.

One preferred embodiment of the gesture sensor 20 can be implemented using an infrared-optical sensor available from Leap Motion, Inc., San Francisco, Calif. For information about the Leap Motion gesture sensor, reference may be had to U.S. Pat. Nos. 8,638,989 and 8,693,731, and to US Published Application 2014/0028861. As shown in FIG. 2, this sensor uses infrared emitters 24 and infrared cameras 26 which are positioned in a spaced-apart pattern so that different images of the user's hand and fingers are detected from slightly different vantage points.

Figure 3:
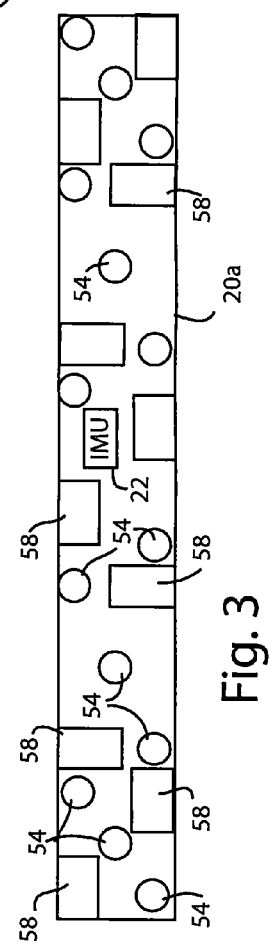
FIG. 3 is a second embodiment of a gesture sensor.

An alternate embodiment of a gesture sensor is shown in FIG. 3. The gesture sensor 20a of this alternate embodiment comprises an array of emitters 54 and a separate array of photo detectors 58. The gesture sensor 20a of FIG. 3 also shows how the IMU 22 may be incorporated into the gesture sensor. The gesture sensor 20a works by illuminating selected ones of the emitters 54 while activating selected ones of the photo detectors to sense different spatial regions where the user's hand or fingers may be present. The photo detectors convert these detected gestural movements into electrical signals that are then further processed to remove the effects of vibration and noise as described herein. For more information about the gesture sensor 22a, reference may be had to US Published Application 2012/0293404, assigned to Panasonic Corporation, the assignee of the present application. The entire disclosure of US Published Application 2012/0293404 is hereby incorporated by reference.

As mentioned above, sensing gestural movements within a moving vehicle using non-contact sensors, such as the gesture sensors shown in FIGS. 2 and 3, presents the significant problem that any linear or angular accelerations applied to the vehicle (such as when a car hits bumps in the road, when a boat tosses about in the waves, or when an aircraft enters a banked turn or experiences turbulence), these accelerations interfere with the accurate measurement of the intended gestural command. In one respect, these accelerations produce noise in the measured signals coming from the gesture sensor. Without intelligent processing of these signals, it becomes virtually impossible to separate the intended gestural movement from the unintended acceleration-induced movements and noise. The inventors have studied these induced motion and noise effects and can attribute them to two signal pathways.

The first signal pathway exists because the gesture sensor is affixed to the vehicle and thus any acceleration applied to the vehicle produces a corresponding acceleration within the gesture sensor. Thus, when a car hits a bump in the road, that bump is felt by the gesture sensor, causing the sensor to become momentarily displaced to another location in space. Such displacement appears to the gesture sensor as a movement of whatever near field object it has been sensing. Thus, when the vehicle hits a bump, an object floating in free space (not connected to the vehicle in any way), would appear to move when in fact it is the sensor that has moved.

Figure 5:
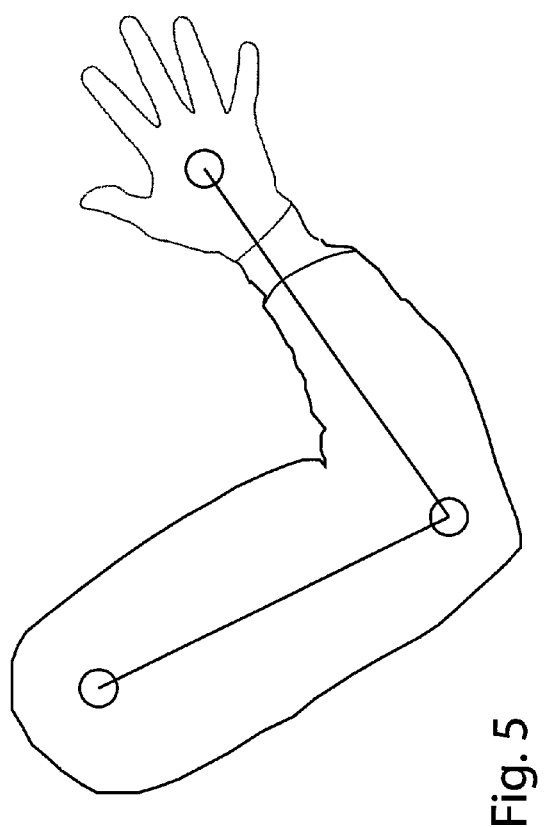
FIG. 5 is an illustration of the human arm showing how the arm may be modeled as a two-segment rigid system.
Figure 6:
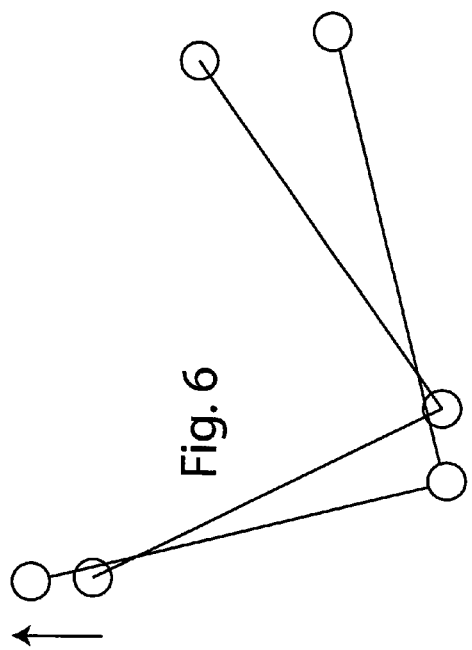
FIG. 6 shows how the human arm, modeled as shown in FIG. 5, reacts when an acceleration is applied to the vehicle and transmitted through the vehicle seat to the human body.

In addition to this first signal pathway, there is a second signal pathway In which accelerations applied to the vehicle are also applied to objects resting within the vehicle, including the passengers of the vehicle. Thus, when the vehicle hits a bump, the passengers' bodies feel the bump (through the vehicle suspension system, seat cushions and the like) and this motion is transmitted through the arm and hand of the person making the gestural command. When compared with the first pathway, this second pathway tends to be more damped, with the produced motion response being delayed or out-of-phase when compared to motions delivered through the first signal pathway. The human arm, for example, as shown in FIGS. 5 and 6, tends to oscillate or bob up and down in response to an applied acceleration and this bobbing motion typically does not directly track in full synchronism with the motion of the vehicle. The outstretched arm will thus bounce up and down for quite some time after the vehicle chassis returns to a steady state after having experienced a momentary shock or bump.

While the first noise pathway and the second noise pathway are unquestionably related, they are quite different. With reference to the model of FIG. 7, if one were to float an object in free space in front of the gesture sensor, the object travelling at the same speed and direction as the vehicle, then an acceleration '$a_t$' produced when the vehicle hits a bump would be felt by the gesture sensor but not by the object floating in free space. In such case, the gesture sensor output '$y_t$' would correspond strictly to the input acceleration '$a_t$' as operated on by transfer function 'h'. In this hypothetical example, there would be no second noise pathway as the free-floating object has no physical connection to feel the acceleration '$a_t$'.

Figure 7:
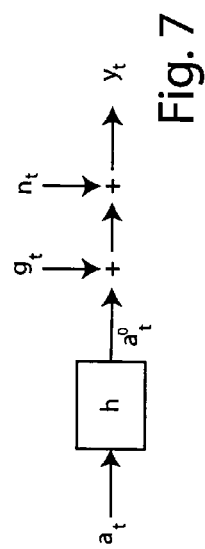
FIG. 7 is a diagrammatic representation of a system model, useful in understanding the operation of the gesture stabilization filter and algorithm.

In order to more accurately separate the intended hand or figure movement gestures from the background disturbances, the invention uses a multi-dimensional noise-reduction algorithm or filter, where the three axes of acceleration measurements from the IMU 22 are combined and used to de-noise the three axes of hand/finger movements as measured by the gesture sensor 20. In order to de-noise the gesture sensor measurements, a preferred embodiment uses the system model shown in FIG. 7. In FIG. 7, '$a_t$' is the acceleration data (in three dimensions) from the IMU 22. The '$y_t$' corresponds to the gesture data (in three dimensions) obtained from the gesture sensor 20. The inputs '$g_t$' and '$n_t$' correspond to the uncorrupted gesture data input by the user (in three dimensions) and the measurement noise (in three dimensions), respectively. The transfer function 'h' converts the acceleration '$a_t$' as measured by the IMU into the corresponding acceleration experienced by the user's hand, '$a_t^o$'. Thus, in one simplified case, '$a_t$' and '$a_t^o$' are related according to the following formula:

$$a_t^o = h * a_t \qquad \text{Eq. 1}$$

In a more complex case, the transfer function can be modeled as a non-linear function that takes into account human reaction time.

The transfer function can be empirically determined, for example, by taking time-synchronized measurements from the IMU and also from a three-axis accelerometer held within the user's hand, with the handheld accelerometers being oriented so that their respective axes match those of the IMU. Measurements are taken under various accelerating and bumpy conditions where the user refrains from making any voluntary gestures.

The system model of FIG. 7 can also be represented by the following equation:

$$y_t = g_t + n_t + \iint a_t^o dt^2 \qquad \text{Eq. 2}$$

The above equation thus illustrates that the output of the gesture sensor '$y_t$' is modeled as the sum of the intended gesture '$g_t$', the measurement noise '$n_t$' and the displacement produced in the user's hand by virtue of the accelerations applied. In this regard, the double integral in the above equation converts acceleration into displacement.

A suitable electronic circuit or filter for removing the effects of acceleration and the measurement noise has been illustrated in FIG. 8. As illustrated, the gesture sensor 20 and IMU 22 are both rigidly attached to the vehicle chassis (or to each other) as has been diagrammatically illustrated. Gesture sensor 20 provides the gesture sensor signal designated '$y_t$' while IMU 22 provides the signal designated '$a_t$'. These two sensors may each include, or have associated therewith, a data storage buffer into which time-stamped frames of data are captured and stored.

Figure 10:
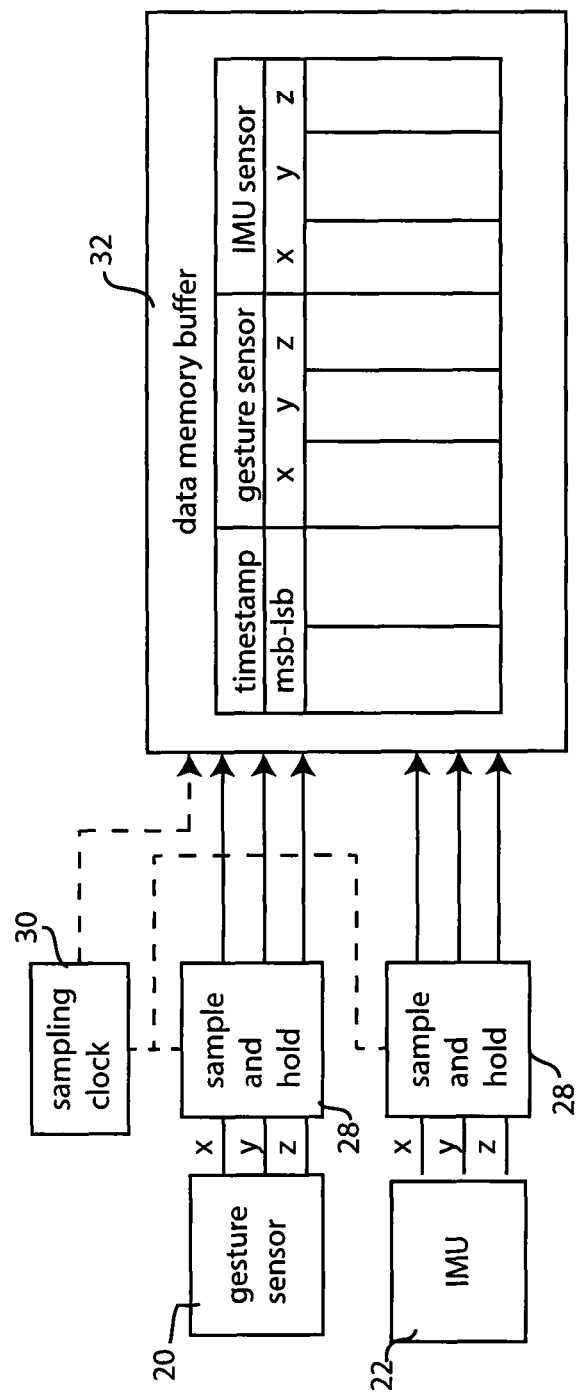
FIG. 10 is a circuit diagram showing an embodiment of a data collection and storage interface circuit used in conjunction with the gesture stabilization filter.

An exemplary data capture, synchronization and storage circuit is shown in FIG. 10. The respective x, y, z channel outputs of the gesture sensor 20 and IMU 22 are fed to sample and hold circuits 28 that are controlled by a common sampling clock 30. The data on the x, y, z channels of the gesture sensor 30 may comprise displacement values; the data on the x, y, z channels of the IM may comprise acceleration values (which are then integrated as stated in Eq. 2 to develop displacement values). Each time the sampling clock instructs, the sample and hold circuits capture the current data extant on the respective gesture sensor and IMU sensor. These data are then stored in the data memory buffer 32 along with a time stamp that uniquely identifies when the sample was taken. If desired, the time stamp can be represented as a word comprising a set of most significant bits (msb) and a set of least significant bits (lsb).

While the circuit shown in FIG. 10 has been depicted using discrete circuit components, it will be appreciated that the functionality provided by the illustrated circuit can be implemented using a programmed microprocessor. For example, a microcontroller circuit, such as a mixed-signal microcontroller (e.g., Texas Instruments MSP-430FR573x) may be used. In addition, while the IMU 22 illustrated here outputs x, y, z components, it will be understood that if the IMU also includes a gyroscopic device, then yaw, pitch, roll outputs would instead be provided, or would be provided in addition to the x, y, z components. Essentially, the x, y, z components represent linear accelerations, while the yaw, pitch, roll components represent angular accelerations.

Returning to FIG. 8, the captured and time-stamped data from the gesture sensor 20 and the IMU 22 are then processed by the circuit depicted in FIG. 8. The circuit in FIG. 8 essentially functions as a sophisticated filter that selectively removes different noise components from the raw gesture sensor signals. The circuit of FIG. 8 can be constructed using discrete components or it may be implemented by a programmed microprocessor.

In the embodiment illustrated in FIG. 8, a complement of adaptive noise elimination filters are used. These include the system estimation filter 34 and the noise elimination filter 36. In this embodiment, these filters are adaptive filters each implemented using a digital adaptive least mean squared algorithm. The system estimation filter is preferably based on a normalized least mean squared algorithm (NLMS). The noise elimination filter is preferably based on a least mean squared algorithm (LMS). These LMS and NLMS filters may be implemented by a programmed processor. For example, the LMS and NLMS filters may be implemented using the filter algorithms generated using Matlab and then compiling them for stand-alone execution. In general, both filter 34 and filter 36 comprise linear filters that implement a transfer function controlled by variable parameters and a means to adjust those parameters according to an optimization algorithm.

Generally speaking, the closed loop adaptive process involves the use of a cost function, which is a criterion for optimum performance of the filter, to feed an algorithm, which determines how to modify filter transfer function to minimize the cost on the next iteration. The most common cost function is the mean square of the error signal.

In order to provide a proper input, the system estimation filter 34, which is a normalized (NLMS) filter, the gesture sensor signal '$y_t$' requires preprocessing to conform the data to a stationary non-zero mean Gaussian domain. To do this, the gesture sensor signal is first fed through a sliding window 38 which has the effect of removing the non-stationary noise component. Then a mean estimation process performed at 40 and the mean is used to perform bias removal at 42. This has the effect of removing the non-zero mean noise. The sliding window 38 is implemented by using a predefined window size corresponding to a predefined number of frames or data samples that are stored in the data memory buffer 32 (FIG. 10). For example, a window size of 30 frames might be chosen. The data for these 30 frames is processed by the mean estimation process step 40 where the respective x, y and z values are averaged to compute the mean. This computed mean is then subtracted from the individual data values, thereby essentially removing the bias at 42. The sliding window 38 is then moved to another successive set of stored data and the process is repeated. Essentially, the sliding window, mean estimation and bias removal step are forcing the data to nominally track the zero baseline. While the gesture sensor signal may oscillate from frame to frame above or below that baseline, the average signal, after this preprocessing, is centered about the baseline.

In preprocessing, the gesture sensor signals the sliding window size is chosen so that intended gestures made by the vehicle occupant are not filtered out. This is done by choosing a sliding window size that corresponds to a time interval that is shorter than the nominal time it takes for the human body and human nervous system to make a gestural motion. For example, if a human finger gesture takes nominally 200 milliseconds or longer, then the sliding window would be chosen to have a period that is less than half of the human gesture interval. In this way, the intended human gesture will not be substantially removed during the bias removal process.

Once the gesture sensor signal has been cleaned up to remove any bias or drift, the cleaned up gesture sensor signal is fed to the system estimation filter 34. This filter also receives an input from the IMU 22 which has also been processed through a sliding window 44, preferably based on the same window size as sliding window 38. These input data are then processed by a NLMS algorithm which effectively computes or generates an estimation of the transfer function 'h' shown in FIG. 7. The system estimation filter 34 thus effectively computes an estimation of the transfer function 'h' shown in FIG. 7.

Next, the 'h' estimate value is fed to a similarly configured noise estimation filter (LMS) 36, which computes or generates an estimation of the measurement noise '$n_t$'. Measurement noise constitutes that component of the overall noise that is not directly attributable to the acceleration-induced motions. In this case, the LMS filter 36 is supplied with the transfer function estimate 'h' (from filter 34) and the '$y_t$' gesture sensor signal and computes an estimate of the measurement noise '$n_t$'. Intuitively, it can be seen that given knowledge of the 'h' transfer function, filter 34 can effectively zero-out the effects of acceleration-induced motion. Thus, when gesture signals are not present ($g_t$=0) the '$y_t$' signal and the '$n_t$' signal are effectively equal. See FIG. 7 and Eq. 2.

Once the respective parameters of Eq. 2 have been determined, using filters 34 and 36, the gesture signal '$g_t$' is computed by computation circuit 50. Computation circuit is fed as inputs the estimated values of 'h', '$n_t$', and the gesture sensor output '$y_t$' and can thus calculate '$g_t$' using the formula of Eq. 2. In this regard, '$g_t$' represents the final "cleaned-up" gesture signal that may then be used to control devices within the vehicle.

Filter Parameter Tuning

In one preferred embodiment, the filters 34 and 36 may be tuned using empirical measurements. The process for performing such parameter tuning will now be described. As an initial step in the tuning process, the data capture circuit of FIG. 10 is used to capture three different data sets: data set #1, data set #2 and data set #3, which may be generated as follows:

Data Set #1:
A person seated in the vehicle holds a three-axis accelerometer in his hand (or the accelerometer is affixed to his hand) while moving the hand over the gesture sensor, making sure the respective axes of the accelerometer are aligned with those of the gesture sensor. Data from the gesture sensor 20, from the IMU 22, and data from the hand-mounted accelerometer are captured in synchronism for a plurality of samples.

Data Set #2:
With the vehicle stationary, such as being parked with engine off, a person seated in the vehicle, with hand held over the gesture sensor, attempts to hold his hand steadily pointing at a fixed point while the vehicle is jolted by an externally applied force to simulate bumps. Data from the gesture sensor are captured for several such simulated bumps. Then the person makes a single gestural movement (such as a simple seek and select interaction as if moving the finger to point to a selected region in space and then giving a flick of the finger to designate selection) while data from the gesture sensor 20 and from the IMU 22 are captured from the gesture sensor.

Data Set #3:
With a person seated in the vehicle with hand held over the sensor, the vehicle is driven on a test course (under actual traveling conditions as would be experienced in real life) while the person attempts to keep his hand positioned and finger pointed at a fixed point. Data from the gesture sensor 20 and from the IMU 22 are captured.

Parameter Tuning

Figure 11:
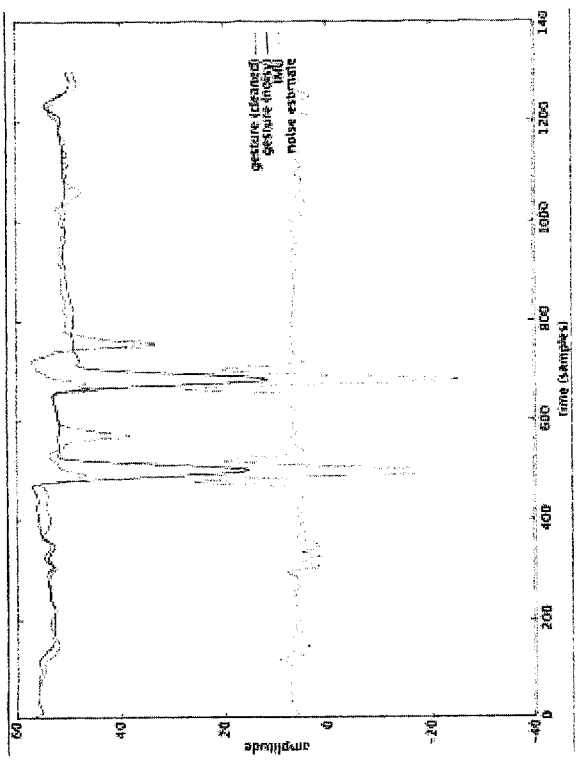
FIG. 11 is a graph of amplitude vs time (samples) showing the tuning results on exemplary set #1 data with centered filter, size=32.

In order to tune the algorithm parameters, start from the data set #1. This data set is preferably used for tuning because if the system were perfectly tuned and the algorithm worked ideally, the output should be a constant signal, since both the gesture sensor and the accelerometer are subjected to the same signal and should cancel out. FIG. 11 shows tuning results: notice that the dynamic range of the magenta signal is much smaller than the black signal, confirming the algorithm is working correctly on this test set.

Figure 12:
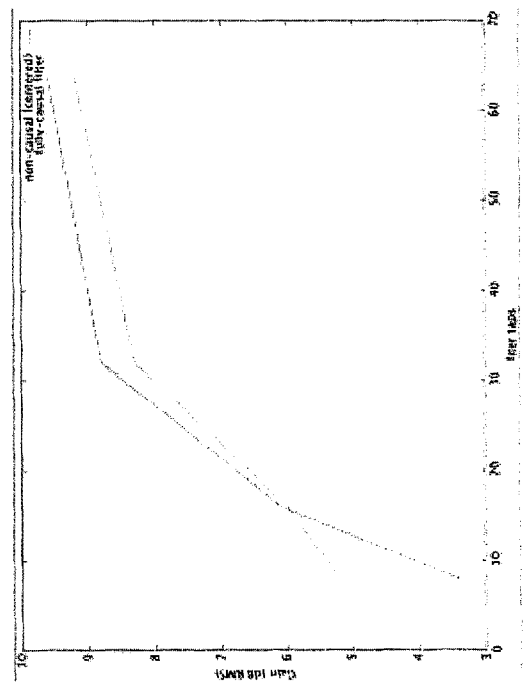
FIG. 12 is a graph of gain (db RMS) vs filter taps showing the tuning results on exemplary set #1 data.

We next investigate the effect of filter length and causality. Filter length is important because it affects computational complexity (the longer the filter, the higher the complexity), and causality is good because if we only use a causal filter, there will be no processing delay, whereas a centered non-causal filter will require buffering and a delay equal to half the filter length. FIG. 12 shows SNR gains depending on filter length and causality: we can quickly assess that for lengths over 30-40 taps, there are diminishing returns; also, causality will reduce gain of only about 1 dB RMS. At 32 taps for causal filters, we can see a gain of about 8 dB, so we will use this as our benchmark. Learning rates are always fixed to $10^{-1}$.

Experimental Results

Figure 13:
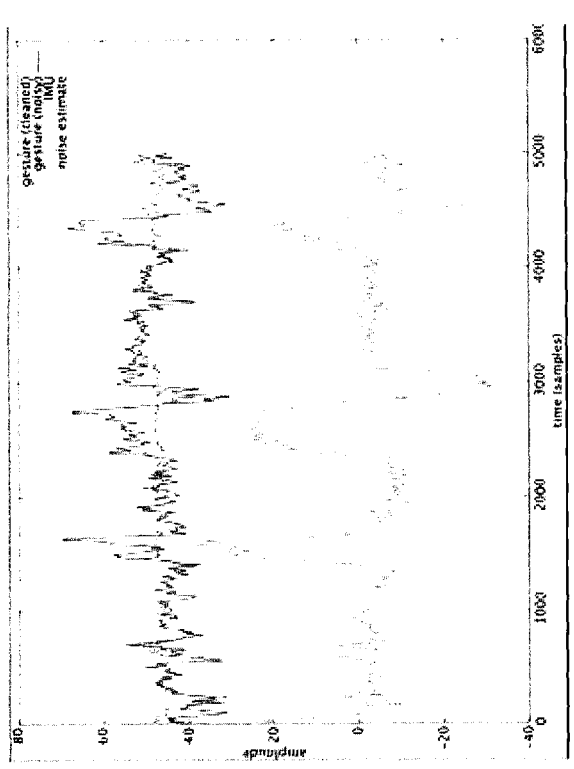
FIG. 13 is a graph of amplitude vs time (samples) showing the tuning results on exemplary set #2 data with centered filter, size=32.

We next report results on the more realistic set #2 and set #3. From FIG. 13, we can see that a significant de-noising is achieved after the filter adapts and before the hand movement. We can also observe that the sudden hand movement (at around frame 900) is well tracked, and not smoothed out. However, it is also apparent that right after the big hand movement (the spike in the figure), the filter loses some of its tracking abilities for a while, before it adapts again. If desired, the adaptive filter algorithm may be implemented using adaptive learning rates, to compensate for this momentary loss of tracking ability.

Figure 14:
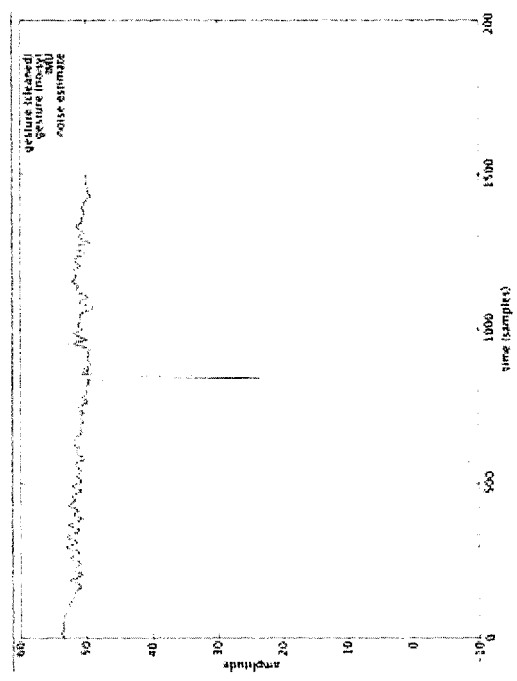
FIG. 14 is a graph of amplitude vs time (samples) showing the tuning results on exemplary set #3 data with causal filter, size=32.

Finally, we report results on the most realistic set #3 recorded during driving conditions. FIG. 14 shows a surprisingly good de-noising performance of our algorithm on this test set; in average very close to the gain of 8 dB measured on the synthetic data set #1. This demonstrates that our filter algorithm is very effective in stabilizing the gesture signal for input control in mobile environments.

Confidence Bands Processing

As a byproduct of performing the NLMS filter algorithm, filter 34 provides a prediction error value, reflecting the confidence level in the instantaneous estimation of the transfer function 'h'. As shown in FIG. 9, this prediction error value may be fed to a downstream threshold circuit 52 that performs a detection algorithm that rejects gesture estimates calculated by computation circuit 50 when those estimates are deemed too noisy to clean up by the filters. The detection algorithm thus blocks those noisy gesture estimates from being propagated to downstream processing stages.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stabilized gesture detecting circuit for use with a vehicle comprising:
    an inertial sensor mounted to said vehicle and producing a vehicle motion signal indicative of changes in vehicle motion;
    a non-contact gesture sensor mounted in fixed relation to said inertial sensor and producing a gesture signal in response to hand gestural motions of a vehicle occupant;
    a filter coupled to receive said vehicle motion signal and said gesture signal and producing a filtered gesture signal;
    the filter being tuned to reduce motion-induced noise in said gesture signal corresponding to movement of the gesture sensor; and
    the filter being further tuned to reduce motion-induced noise in said gesture signal corresponding to vehicle motion-induced non-gestural motion of the vehicle occupant's hand.

2. The circuit of claim 1 wherein the inertial sensor is an accelerometer producing an acceleration signal indicative of said changes in vehicle motion.

3. The circuit of claim 2 wherein the accelerometer is a three-axis accelerometer, producing acceleration signals corresponding to three orthogonal axes.

4. The circuit of claim 1 wherein the gesture sensor comprises a collection of optical emitters and detectors.

5. The circuit of claim 1 wherein the filter is further tuned to reduce measurement noise in said gesture signal corresponding to measurement errors in the gesture signal.

6. The circuit of claim 1 wherein the filter is an adaptive filter corresponding to a transfer function that relates vehicle motion-induced acceleration measured at said gesture sensor to vehicle motion-induced acceleration measured at the vehicle occupant's hand.

7. The circuit of claim 6 wherein the adaptive filter implements at least one least mean squared (LMS) algorithm.

8. The circuit of claim 1 wherein the filtered gesture signal is adapted to be coupled to control a device associated with the vehicle;
    wherein the filter is an adaptive filter that generates a confidence signal indicative of how accurately the adaptive filter is tracking the gesture signal; and
    further comprising a threshold circuit coupled to receive said confidence signal and operative to inhibit use of the filtered gesture signal to control said device associated with the vehicle when the confidence signal is below a predetermined threshold.

9. The circuit of claim 1 wherein the filter is an adaptive filter that includes a first preprocessing circuit that receives the gesture signal and removes bias and drift to produce an adjusted gesture signal.

10. The circuit of claim 1 wherein the filter is an adaptive filter that includes a first preprocessing circuit that receives the gesture signal and produces an adjusted gesture signal that conforms to a stationary non-zero mean Gaussian domain.

11. The circuit of claim 10 wherein the filter further includes a normalized least mean squared filter receptive of the adjusted gesture signal and that generates an estimated transfer function that relates vehicle motion-induced acceleration measured at said gesture sensor to vehicle motion-induced acceleration measured at the vehicle occupant's hand.

12. The circuit of claim 11 wherein the filter further includes a computation circuit receptive of said estimated transfer function and said gesture signal and which calculates said filtered gesture signal by using the estimated transfer function and the vehicle motion signal to calculate a displacement of the occupant's hand associated to said vehicle motion-induced non-gestural motion and then subtracting said displacement from said gesture signal.

13. The circuit of claim 11 wherein the filter further includes a second least mean square filter receptive of said estimated transfer function that generates a measurement noise estimation signal.

14. The circuit of claim 13 wherein the filter further includes a computation circuit receptive of said estimated transfer function and said gesture signal and which calculates said filtered gesture signal by using the estimated transfer function and the vehicle motion signal to calculate a displacement of the occupant's hand associated to said vehicle motion-induced non-gestural motion and then subtracting said displacement and said measurement noise estimation signal from said gesture signal.

15. A method of stabilizing a gesture detecting circuit comprising:
    electronically receiving and applying as input to a filter circuit a vehicle motion signal;
    electronically receiving and applying as input to said filter circuit a non-contact gesture sensor signal; and
    tuning the filter circuit to reduce motion-induced noise in said gesture signal corresponding to movement of the gesture sensor while additionally tuning said filter circuit to reduce motion-induced noise in the gesture signal corresponding to vehicle motion-induced non-gestural motion of the vehicle occupant's hand.

16. The method of claim 15 further comprising tuning the filter circuit to reduce measurement noise in said gesture signal corresponding to measurement errors in the gesture signal.

17. The method of claim 15 wherein the filter is an adaptive filter corresponding to a transfer function that relates vehicle motion-induced acceleration measured at said gesture sensor to vehicle motion-induced acceleration measured at the vehicle occupant's hand.

18. The method of claim 17 wherein the adaptive filter implements at least one least mean squared (LMS) algorithm.

19. The method of claim 15 wherein the filtered gesture signal is adapted to be coupled to control a device associated with the vehicle;
    wherein the filter is an adaptive filter that generates a confidence signal indicative of how well the adaptive filter is tracking the gesture signal; and
    further comprising a threshold circuit coupled to receive said confidence signal and operative to inhibit use of the filtered gesture signal to control said device associated with the vehicle when the confidence signal is below a predetermined threshold.

20. The method of claim 15 wherein the filter is an adaptive filter that includes a first preprocessing circuit that receives the gesture signal and removes bias and drift to produce an adjusted gesture signal.

21. The method of claim 15 wherein the filter is an adaptive filter that includes a first preprocessing circuit that receives the gesture signal and produces an adjusted gesture signal that conforms to a stationary non-zero mean Gaussian domain.

22. The method of claim 21 wherein the filter further includes a normalized least mean squared filter receptive of the adjusted gesture signal and that generates an estimated transfer function that relates vehicle motion-induced acceleration measured at said gesture sensor to vehicle motion-induced acceleration measured at the vehicle occupant's hand.

23. The method of claim 22 wherein the filter further includes a computation circuit receptive of said estimated transfer function and said gesture signal and which calculates said filtered gesture signal by using the estimated transfer function and the vehicle motion signal to calculate a displacement of the occupant's hand associated to said vehicle motion-induced non-gestural motion and then subtracting said displacement from said gesture signal.

24. The method of claim 21 wherein the filter further includes a second least mean square filter receptive of said estimated transfer function that generates a measurement noise estimation signal.

25. The method of claim 24 wherein the filter further includes a computation circuit receptive of said estimated transfer function and said gesture signal and which calculates said filtered gesture signal by using the estimated transfer function and the vehicle motion signal to calculate a displacement of the occupant's hand associated to said vehicle motion-induced non-gestural motion and then subtracting said displacement and said measurement noise estimation signal from said gesture signal.

* * * * *